United States Patent [19]

Milianowicz

[11] Patent Number: 4,612,429
[45] Date of Patent: Sep. 16, 1986

[54] MULTIPLE-IMPACT SHOCK ABSORBING MEANS FOR CIRCUIT INTERRUPTER AND OTHER APPARATUS

[75] Inventor: Stanislaw A. Milianowicz, Monroeville, Pa.

[73] Assignee: Westinghouse Electric Corp., Pittsburgh, Pa.

[21] Appl. No.: 640,425

[22] Filed: Aug. 13, 1984

[51] Int. Cl.⁴ .............................................. H01H 3/60
[52] U.S. Cl. .............................. 200/288; 200/153 SC; 267/162
[58] Field of Search ................. 200/288, 153 SC, 237, 200/153 H, 153 G; 267/141.1, 158, 162

[56] References Cited

U.S. PATENT DOCUMENTS

| | | | |
|---|---|---|---|
| 3,544,415 | 12/1970 | Price et al. | 267/141.1 |
| 3,674,251 | 7/1972 | Tirabassi | 267/162 |
| 4,064,383 | 12/1977 | Barkan | 200/288 X |
| 4,267,419 | 5/1981 | Maier et al. | 200/288 |
| 4,491,709 | 1/1985 | Chabot et al. | 200/153 SC |

*Primary Examiner*—Stephen Marcus
*Assistant Examiner*—Ernest G. Cusick
*Attorney, Agent, or Firm*—D. S. Buleza

[57] ABSTRACT

The kinetic energy generated by the rapidly moving contact and coupled operating mechanism of a tripped circuit breaker or similar apparatus is dissipated by a compressible shock-absorbing assembly comprising a loose stack of metal plates and interposed springs which is mounted on a stationary part of the breaker and is struck by a lever fastened to the main operating shaft of the breaker operating mechanism. The metal plates are movable toward and away from one another due to the resiliency of the springs and the resulting multiple impacts between the plates and advancing striker lever produces a momentum exchange phenomenon which quickly dissipates the kinetic energy and brings the breaker operating mechanism and movable contact to a smooth stop. The compressible multiple-impact assembly provides a compact shock absorbing means that is especially adapted for use in medium voltage circuit breakers (5 to 35 KV rating) of various types which is not only durable and efficient but very inexpensive and reliable. The improved shock absorber is also adapted for use in guns and the like which require a suitable means for counteracting the recoil produced when the gun is fired.

10 Claims, 11 Drawing Figures

MULTIPLE-IMPACT SHOCK ABSORBING MEANS FOR CIRCUIT INTERRUPTER AND OTHER APPARATUS

BACKGROUND OF THE INVENTION

1. Field of the Invention

This invention relates generally to shock absorbing devices and, more particularly, to a mechanical-impact type shock absorbing means for a circuit interrupter which rapidly dissipates the kinetic energy of the movable contact and its operating mechanism during the opening stroke of the interrupter.

2. Description of the Prior Art

As is well known, power circuit interrupters or breakers generally comprise a pair of separable contacts that are operated within an enclosure which provides an insulating means (a vacuum, $SF_6$ gas, oil, etc.) that efficiently extinguishes the arc generated when the contacts are forceably separated and then prevents the arc from restriking as the contacts continue to be rapidly opened until they are spaced a predetermined distance apart. The contact-opening operation, once triggered by a suitable signal means (manual or automatic) and trip mechanism, is completed in as short an interval of time as is mechanically possible in order to provide maximum protection to the power transmission line and associated equipment.

A major problem in the design of such power circuit breakers is the provision of suitable means for not only dissipating the kinetic energy of the movable contact and associated moving parts of the breaker during the contact-opening stroke but controlling the motion and rest positions of these components. The amount of override beyond the ideal rest position of the movable contact and the distance that the contact rebounds from such rest position, when the breaker is tripped, is determined by the mechanical, electrical and thermodynamic characteristics of the breaker and must not exceed certain limits if the breaker is to operate properly. Moreover, due to the large size and mass of the contacts and the related moving parts of the circuit interrupter, the severe mechanical strains imposed on the operating mechanism and associated stationary parts of the interrupter by the rapid deceleration of the moving contact and operating mechanism must be kept within safe limits to avoid excessive mechanical stressing of the operating components and support structure of the interrupter.

It is known in the prior art to use various kinds of shock absorbers to dissipate the kinetic energy of the moving parts of a circuit interrupter in a controlled fashion during the contact-opening operation. Such prior art shock absorbers were of the hydraulic, pneumatic, strain energy or friction type and, while generally satisfactory from a functional standpoint, they were rather complicated in construction and required periodic maintenance and inspection to insure that they were in good operating condition and properly adjusted. Moreover, they were not as cost-effective as the device described hereinafter.

SUMMARY OF THE INVENTION

The present invention avoids the cost and other disadvantages of the shock absorbing devices used in the prior art circuit interrupters and breakers by providing an energy-dissipating means which is simple, reliable, durable, compact and very inexpensive. In accordance with a preferred embodiment of the invention, the kinetic energy of the moving contact and coupled parts of the breaker operating mechanism is absorbed and quickly dissipated by means of a momentum exchange effected by a stack of metal plates that are separated from each other by interposed wafer-like springs and are free to move relative to one another in a direction transverse to the planes of the plates—that is, along a path that extends in substantially the same direction as the axis along which the plates and springs are stacked. A lever attached to the main operating shaft of the circuit breaker strikes the stack of spring-separated plates at a predetermined time before the end of the contact-opening stroke of the operating mechanism after the circuit breaker has been tripped. The resultant compression of the stacked assembly of springs and plates produces a series of shock-absorbing interactions and momentum-exchanging impacts between the advancing lever, plates and between the plates themselves that rapidly dissipates the kinetic energy and brings the lever and breaker operating mechanism (and thus the movable contact) to a smooth stop.

The unique "energy-quenching" effect produced by the multiple collisions of the spring-biased plates in the stack is such that the breaker contact override and rebound are well within the specification limits. Since the plates and wafer-like springs can be readily manufactured and assembled, the multiple-impact shock absorber provided by the present invention is not only very economical but is compact, reliable, durable and requires no maintenance or adjustments once it has been installed in the circuit breaker.

BRIEF DESCRIPTION OF THE DRAWINGS

A better understanding of the invention will be obtained by referring to the exemplary embodiments shown in the accompanying drawing, wherein.

BRIEF DESCRIPTION OF THE PREFERRED EMBODIMENTS

While the invention can be employed in various types of switchgear and other apparatus (such as guns, for example) that require a reliable shock-absorbing means to arrest the movement of an electrical contact and/or parts of an operating (or recoil) mechanism which are driven at high speed when the apparatus is tripped or activated, it is especially adapted for use in power circuit breakers of various types, such as gas-blast, oil, or magnetic air-brake breakers. However, the invention as here described and illustrated is incorporated in a vacuum type circuit breaker.

Figure 1:
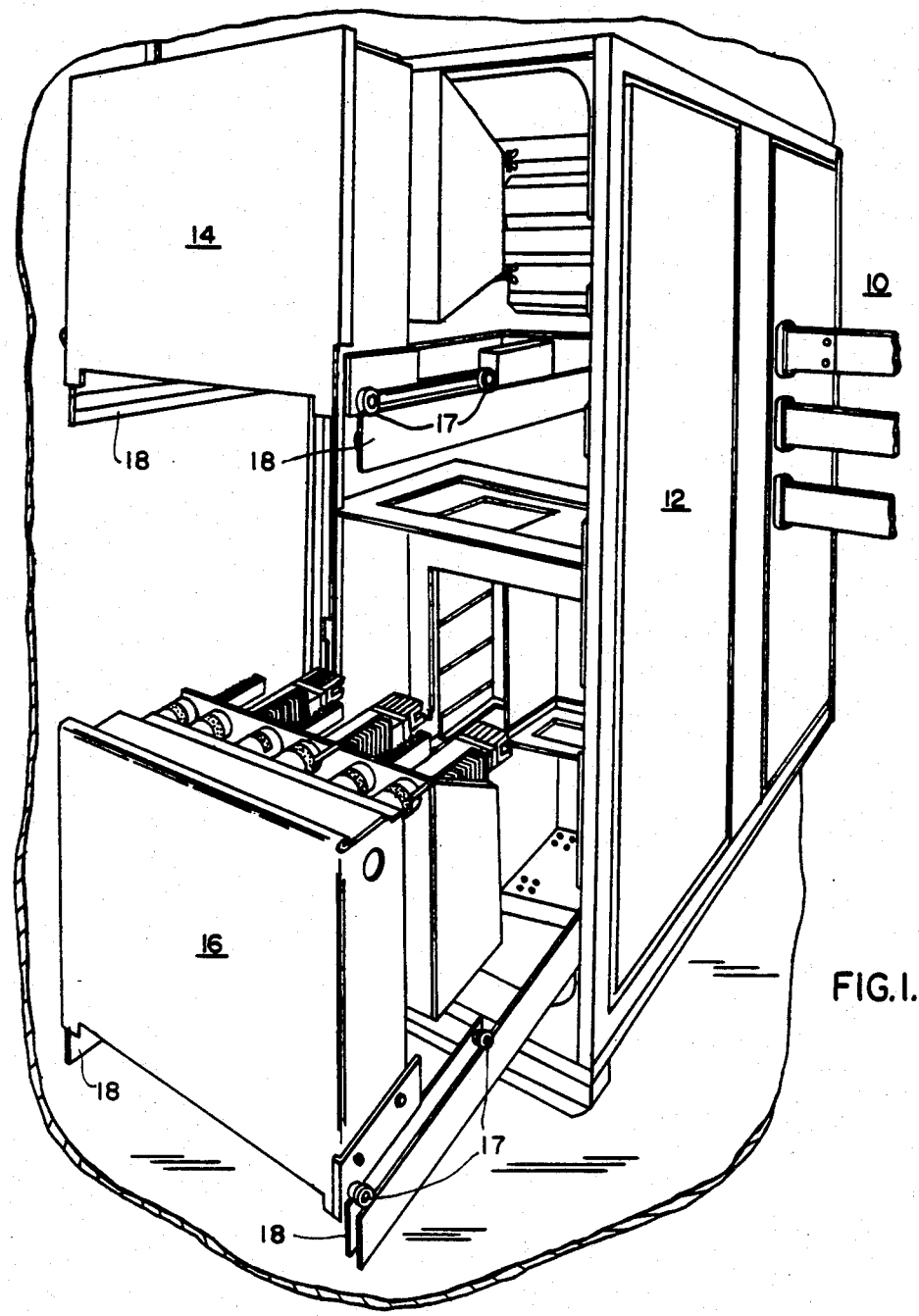
FIG. 1 is a front perspective view of a metal-clad multisection switchgear assembly which contains vacuum type circuit interrupters that are fitted with the improved shock-absorbing structure of the present invention, the circuit interrupter units being shown in their withdrawn exposed positions relative to the metal enclosure.
Figure 2:
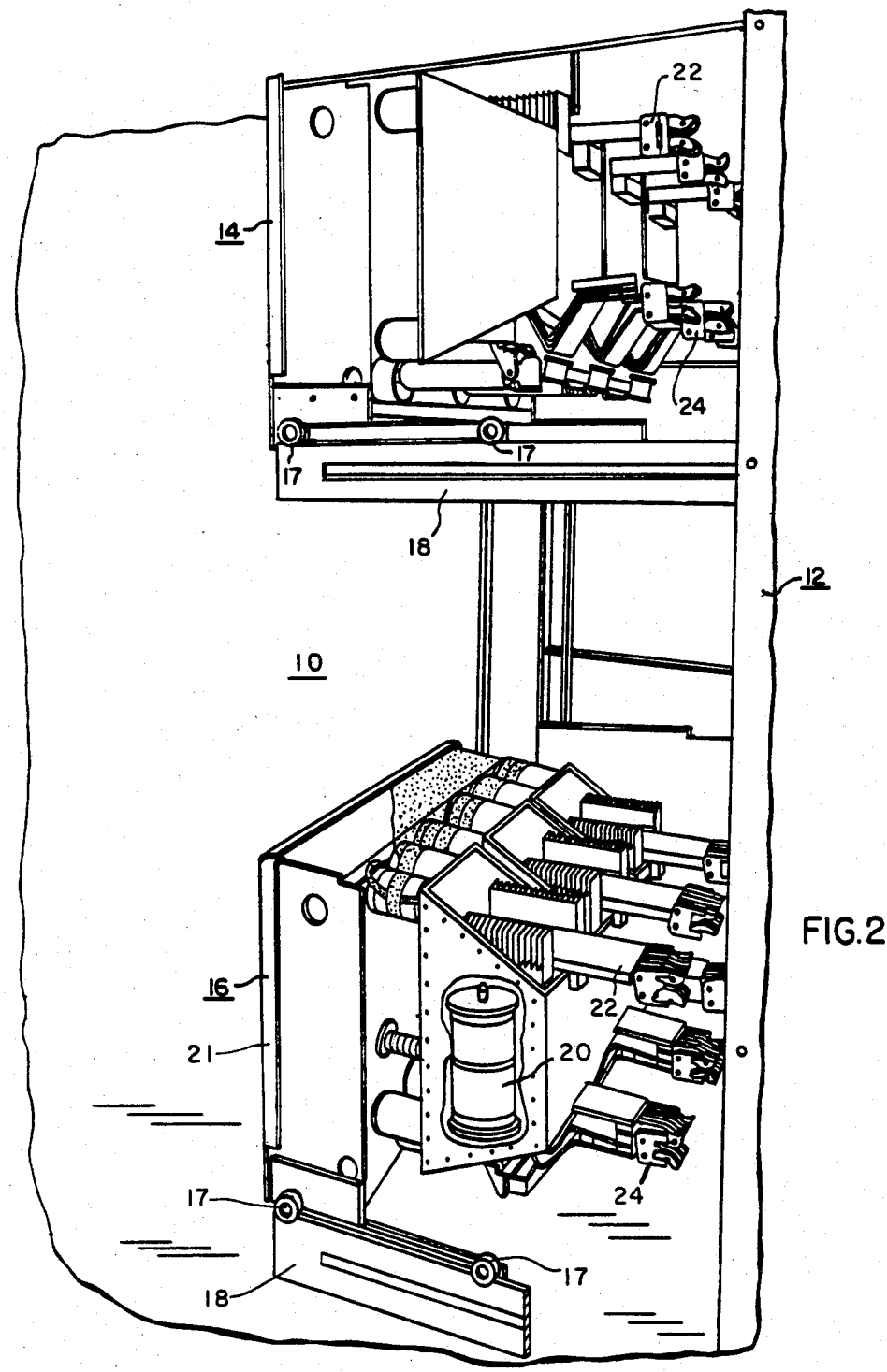
FIG. 2 is a side perspective view of the withdrawn circuit interrupter units of the switchgear apparatus shown in FIG. 1.

Referring now to the drawings in detail, in FIGS. 1 and 2 there is shown a metal-clad switchgear assembly 10 which includes a metal cabinet or enclosure 12 having a pair of vertically arranged three-phase circuit interrupter units 14 and 16 that are adapted to be drawn out of the enclosure for servicing or inspection in the manner illustrated. The circuit interrupter units 14 and 16 are movably mounted on wheels 17 and retractable rails 18 so that the units can be pulled out of the metal enclosure 12 and then returned into operating position as required. The circuit interrupter units 14 and 16 include vacuum type circuit interrupter components 20 (shown in FIG. 2) which are electrically connected to three-phase terminals 22 and 24 disposed to make electrical contact with primary terminals (not shown) in the rear of the metal enclosure 12 when the circuit interrupter units are pushed into the metal enclosure and firmly seated in their normal operating positions in the manner well known in the art.

Figure 3:
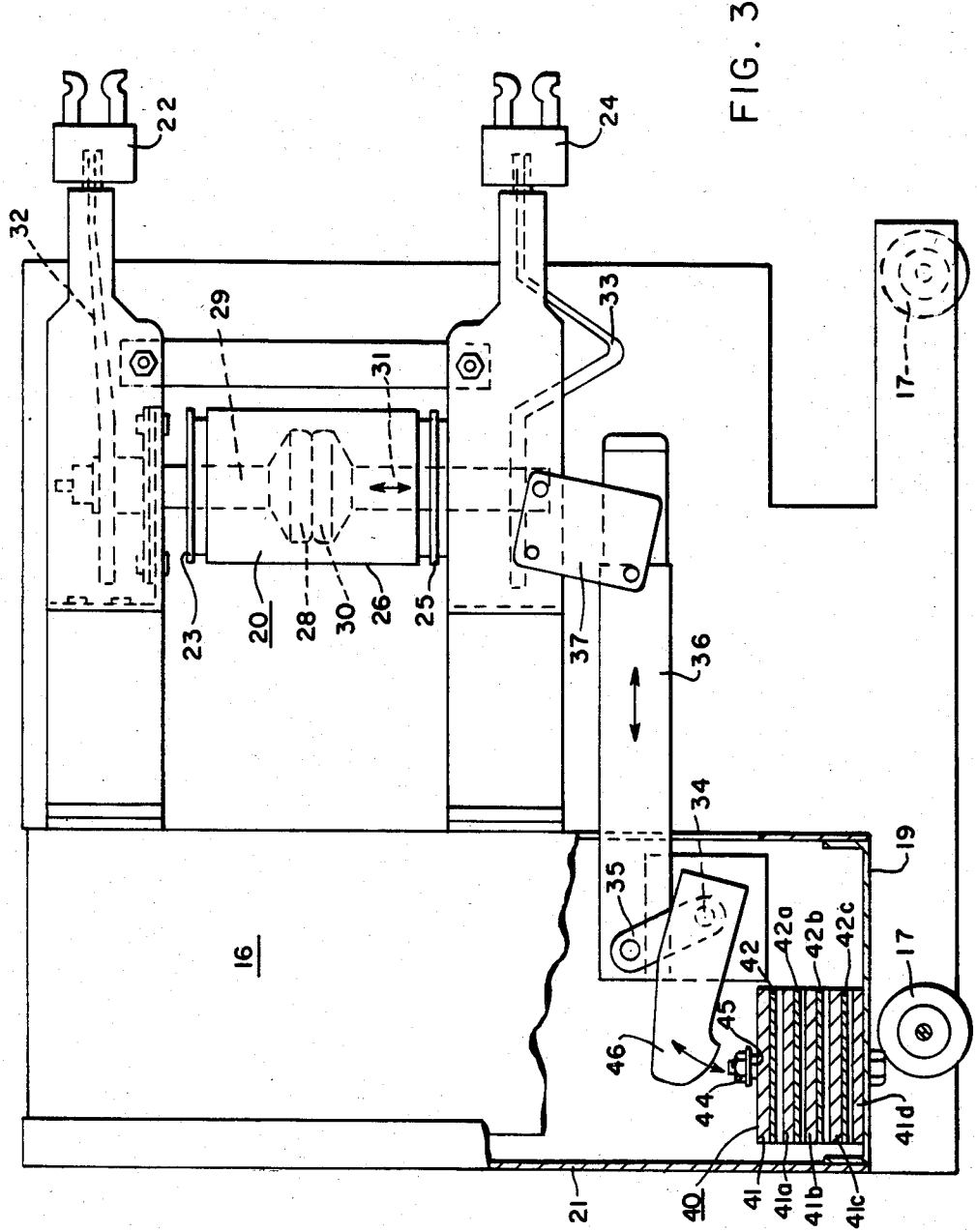
FIG. 3 is an enlarged side elevational view, partly in section, of one of the vacuum circuit interrupter units illustrating the manner in which the movable contact of the interrupter is operatively coupled to the multiple-impact shock absorbing assembly of the present invention.

As shown in FIG. 3, each of the circuit interrupter components 20 consists of a pair of electrically conducting end plates 23 and 25 that are fastened to an insulating cylinder 26 to form a vacuum chamber that contains a pair of separable electrical contacts 28 and 30. Contact 28 is stationary and supported within the vacuum chamber by a contact stem 29 that extends through the end plate 23 and is connected to the associated three-phase terminal 22 by a suitable conductor 32. Contact 30 is reciprocally movable (as indicated by the arrow) and supported by another contact stem 31 that is reciprocally movable along the axis of the cylinder 26 and secured to the associated end plate 25 by a suitable bellows (not shown) which expands and contracts to permit the contact 30 and its stem 31 to move toward and away from the stationary contact 28 without rupturing the vacuum housing. Contact stem 31 is connected to the other three-phase terminal 24 by another conductor 33 which has an angularly bent medial portion that provides the required flexibility to accommodate the movement of the contact stem 31 and contact 30 during the make-circuit and break-circuit operation of the circuit interrupter unit 16.

The movable contact 30 and its support stem 31 are actuated by the customary trip and spring-powered operating mechanisms (not shown) which rotate a main operating shaft 34 that extends laterally along the lower end of the interrupter unit 16 adjacent the front panel 21. Rotation of the operating shaft 34 in a counter-clockwise direction (as viewed in FIG. 3) moves a link 35 which is coupled to a lever arm 36 in such a way that the lever arm is reciprocally driven toward the front panel 21. This movement is transferred to the movable stem 31 by a second link 37 which is so arranged that the stem 31 and its contact 30 are rapidly pulled downward, thus separating the contacts 28, 30 and interrupting the circuit. The sudden opening of the contacts 28 and 30 creates an arc which extinguishes on the next occurring zero due to the insulating dielectric properties of the vacuum in which the contacts are disposed. The operating shaft 34 continues rotating until the contacts 28, 30 are spaced a predetermined distance apart.

The circuit-reclosing cycle is achieved by the reverse movement of the operating mechanism and main shaft 34 which advances the movable contact 30 toward the stationary contact 28 and finally seats it in firm abutting engagement therewith (as indicated by the phantom depiction of the electrodes in FIG. 3). This circuit-reclosing operation simultaneously compresses and cocks the driving spring (not shown) which rapidly actuates and accelerates the movable contact 30 during the contact-opening stroke of the breaker when the main operating shaft 34 is rapidly rotated and such movement is transferred to the movable contact 30 through the coupling system previously described.

Various shield arrangements may also be provided within the vacuum chamber of the interrupter component 20 to prevent vaporized metal material from being deposited on the inner walls of the insulating cylinder 26 and the portion of the bellows that extends into the vacuum chamber, as will be apparent to those skilled in the art.

In accordance with the present invention, the kinetic energy generated by the movable contact 30 and the other components of the interrupter operating mechanism that are coupled to the movable contact is rapidly dissipated by a compressible multiple-impact shock absorbing assembly 40 that is rigidly mounted on the bottom support or frame member 19 adjacent the front panel 21 of the circuit breaker unit 16, as illustrated in FIG. 3. The shock absorbing assembly 40 comprises a series of discrete bodies of durable dense material such as a plurality of metal plates 41, 41a, 41b, 41c and 41d that are loosely stacked one upon the other and separated by interposed resilient biasing means such as metal wafer-like springs 42, 42a, 42b and 42c which are held in stacked relationship with the plates by a pair of elongated pin-like members such as a pair of bolts 44, only one of which is shown in FIG. 3. The stack of metal plates 41–41d and interposed wafer-like springs 42–42c is so positioned within the breaker unit 16 that a suitable striker member such as a lever 46 rigidly attached to the main operating shaft 34 swings toward the stack (along an arcuate path, as indicated by the arrow) during the contact-opening stroke of the breaker and strikes the top plate 41.

The angular position of both the main operating shaft 34 and striker lever 46 bear a fixed relation to the position of the movable breaker contact 30 so that at a predetermined time during the contact-opening stroke, the free end of the lever 46 hits the uppermost plate 41 in the stack which comprises the shock absorbing assembly 40 and initiates the shock absorbing action.

Figure 4:
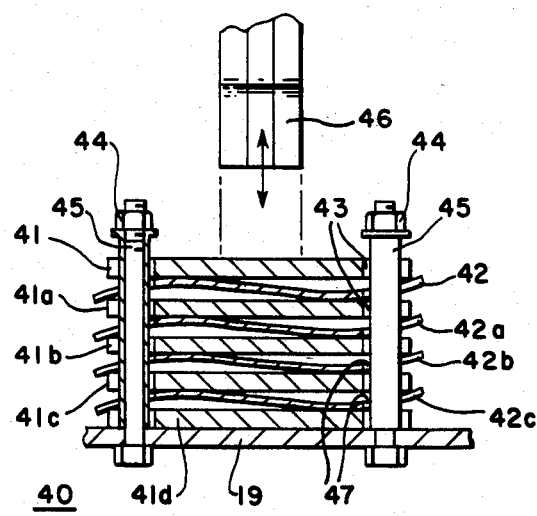
FIG. 4 is an enlarged front sectional view of the shock-absorbing assembly in relaxed condition with the plates separated from one another by the wafer-like springs (contact-closed position)

As shown more particularly in the front sectional view of the shock absorbing assembly 40 illustrated in FIG. 4, the metal wafer-like springs 42–42c are curved to have a shallow S shape and, while much thinner than the metal plates 41–41d, have sufficient resiliency to maintain a predetermined spacing between adjacent plates when the interrupter striker lever 46 is in its raised contact-closed position and the shock absorbing assembly 40 is in relaxed condition. The plates 41–41d and springs 42–42c are retained in loosely stacked position by a pair of suitable pin-like members such as bolts 44 that are secured to the breaker frame 19 and extend through cylindrical sleeves 45 which make a loose sliding fit with suitable aligned openings 43, 47 in opposite sides of the respective plates and springs. The plates 41–41d and springs 42–42c are thus free to move along the axis along which they are stacked and in substantially the same direction as the path followed by the free end of lever 46 as it moves in synchronized fashion with the operating shaft 34 and movable contact 30.

Figure 5:
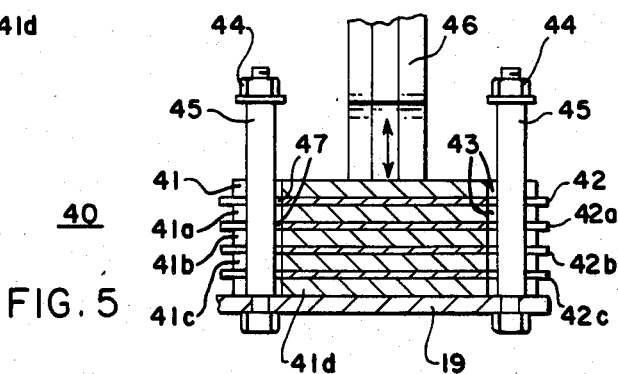
FIG. 5 is a similar view of the shock-absorbing assembly with the plates and springs compressed (contact-open condition)

As shown in FIG. 5, when the circuit breaker 10 is in tripped contact-open position the operating mechanism and main drive shaft 34 of the breaker have swung the striker lever 46 through an arc such that the end of the lever is in contact with the top plate 41 of the multiple-impact shock absorbing assembly 40 and each of the wafer-like springs 42–42c are compressed flat. The stack is thus collapsed and the plates 41–41d are in intimate contact with the adjacent surfaces of each of the compressed interposed springs 42–42c.

Figure 6:
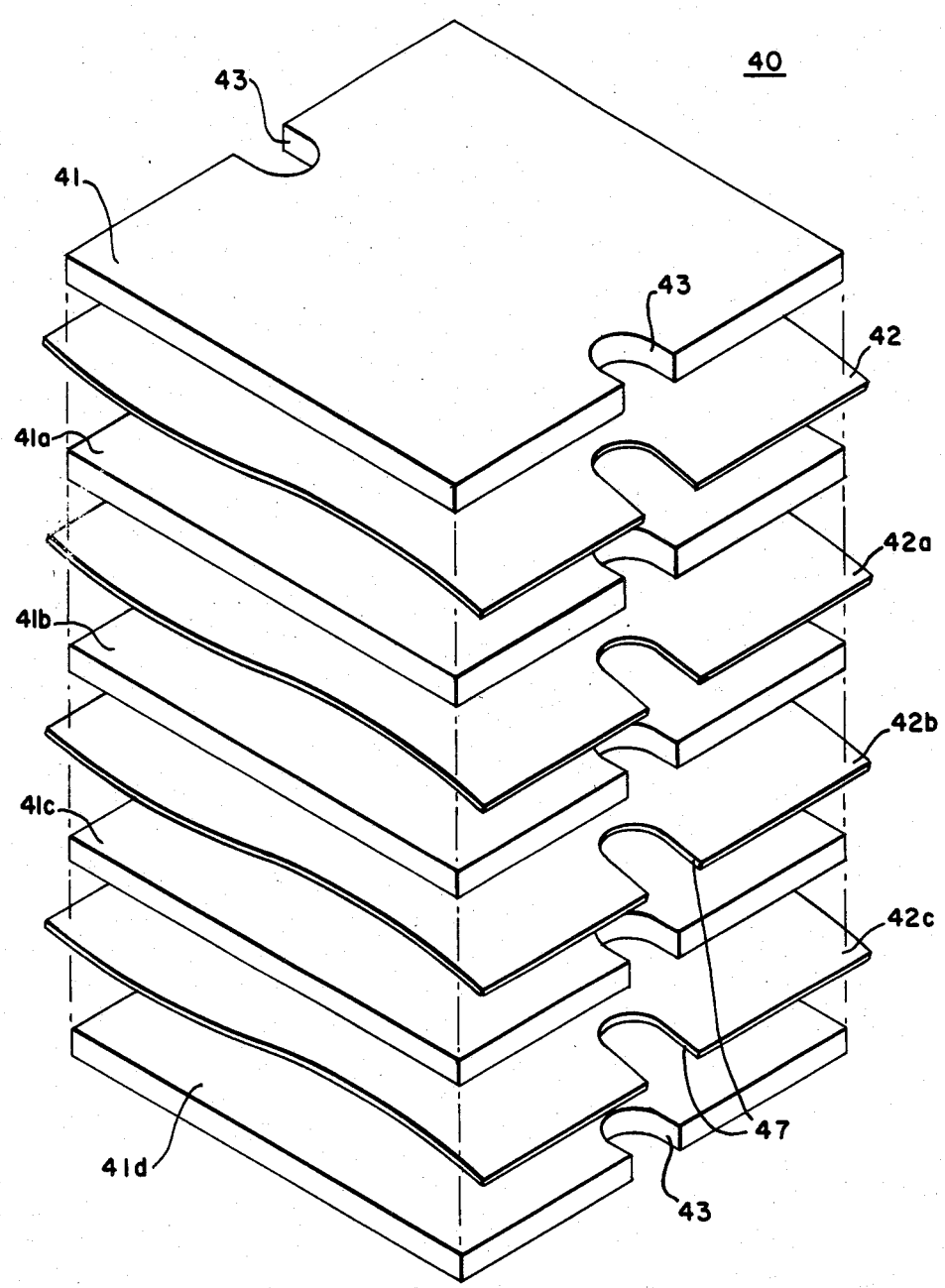
FIG. 6 is an enlarged exploded pictorial view of the plates and interposed springs of the shock absorbing assembly shown in FIGS. 3-5.

As will be noted from the exploded view of the stacked metal plate 41–41d and wafer-like springs 42–42c of the shock absorbing assembly 40 shown in FIG. 6, each of the plates 41–41d in this particular embodiment are of square configuration and of the same size and thickness. Centrally positioned U-shaped openings 43 are provided at opposite sides of each plate 41–41d and dimensioned to make a loose sliding fit with the upstanding retaining sleeves 45 that are rigidly fastened to the support frame 19 of the circuit interrupter unit 16 by the bolts 44 (as shown in FIGS. 3–5). Each of the wafer-like springs 42–42c is also of the same size and thickness but are somewhat longer than the plates 41–41d so that they are of generally rectangular shape with end segments that protrude slightly beyond the corresponding end edges of the stacked plates. The springs 42–42c are each provided with a pair of oppositely-disposed U-shaped side openings 47 that are oriented to be aligned with the openings 43 in the respective plates 41–41d when the plates and springs are arranged in their operative stacked relationship shown in FIG. 6.

OPERATION OF SHOCK ABSORBING ASSEMBLY

When the lever 46 strikes the top plate 41 of the shock absorbing assembly 40 at a predetermined time during the contact-opening stroke of the circuit breaker 16, this first impact of the lever 46 causes some of the kinetic energy to be transferred to the top plate 41 and results in a small total energy loss due to the imperfect restitution properties of the plate and spring materials. The net result is that the first impact of the striker lever 46 with the stacked plates 41–41d reduces the velocity of the lever and, due to the small mass of the plate, propels the top plate 41 away from the lever 46 at a speed greater than that of the lever. As a result of this momentum exchange, the top plate 41 compresses the underlying wafer-like spring 42 until it is flat—thus permitting the top plate to collide with the next plate 41a in the stack.

Since the plates 41–41d are of the same shape and size they each have the same weight or mass. The collision of plates 41 and 41a thus brings the top plate 41 to a standstill and the second plate 41a in the stack is propelled toward the third plate 41b at about the same speed or velocity at which the first plate was traveling before it impacted the second plate. The second plate 41a, in turn, is stopped and brought to rest after it compresses the interposed wafer-like spring 42a and collides with the third plate 41b. These sequential spring compressions and plate collisions proceed at rapid speed down through the stack until plate 41c strikes plate 41d, the last plate in the stack which rests on the support frame 19 of the interrupter unit 16. Since the last plate 41d is fixed in place and stationary, the fourth plate 41c rebounds after hitting it and thus moves in the reverse direction back toward the third plate 41b.

As the succession of impacts rapidly proceeds downwardly and upwardly through the stack of plates 41–41d, the striker lever 46 attached to the main operating shaft 34 continues to move downwardly at a reduced speed due to its first impact with the top plate 41 and then again strikes the top plate 41 which has been brought to rest and is stationary as a result of its previous impact with the second plate 41a. As a result of this second impact of the striker lever 46 with the top plate 41, additional kinetic energy is transferred from the lever 46 to the top plate 41 and the series of impacts and momentum-exchanges between each pair of successive plates proceeds in the same manner as described previously, until the fourth plate 41c (the next to the last plate in the stack) is reached. Plate 41c may, at this time, be moving slowly away from the bottom plate 41d or it may be almost in contact with the bottom plate.

While these plate interactions and momentum-exchanging collisions are taking place, the lever 46 strikes the top plate 41 for a third time which produces another succession of impacts between the plates 41–41d in the stack. After the fourth, fifth, sixth or possibly seventh collision and momentum exchange between the lever 46 and the top plate 41, the speed of the striker lever 46 will have been progressively decreased until the lever and the coupled movable contact 30 are brought to rest within a predetermined period of time and travel distance in such a manner that the contact override and the rebound effect are well within the tolerance limits set for the interrupter unit 16.

The sole function of the wafer-like springs 42–42c is to have enough resiliency to keep the metal plates 41–41d apart rather than to absorb any significant amount of kinetic energy upon being compressed. The energy-dissipating effect of the weak springs 42–42c has accordingly not been mentioned in the aforesaid description of the series of multiple collisions and momentum-exchanged impacts between the stacked plates 41–41d and interrupter lever 46. The conversion of some of the kinetic energy into heat at each plate-to-plate collision as a result of the imperfect restitution properties of the materials has also been omitted from the description of the lever-plate-spring interactions in the interest of brevity.

It will accordingly be apparent to those skilled in the art that the multiple-impact shock absorbing assembly 40 of the present invention achieves the desired rapid and smooth deceleration of the striker lever 46 (and hence the movable contact 30 and associated coupled operating parts of the interrupter unit 16) by decreasing the velocity of the contact 30 and lever 46 through a series of impacts and momentum exchanges between the total equivalent mass of the interrupter components and the much smaller mass of the top plate 41 in the stack—and the resultant concomitant removal and dissipation of the kinetic energy by the multiple collisions and momentum exchanges which sequentially occur between adjacent pairs of the plates within the stack as a result of each of the impacts between the interrupter striker lever 46 and top plate 41.

As will be appreciated by those skilled in the art, the invention is not limited to the use of square shaped plates 41–41d and rectangular-shaped substantially planar wafer-like springs 42–42c of the type illustrated in FIGS. 3-6 but can employ plate-like members and springs of various shapes and sizes—as long as the proper correlation is maintained between the mass of the plates and the much larger total equivalent mass of the movable contact and other moving parts of the circuit interrupter apparatus or other device in which the multiple-impact shock absorbing assembly 40 is used. For example, the plates and interposed wafer-like springs can be of circular, triangular or elliptical shape if desired. The individual plates and springs can also be of varying thickness to provide different degrees of shock absorbing ability at different points along the longitudinal axis of the stack. Discrete bodies such as blocks of dense durable non-metallic material can also be used instead of metal plates and coiled rather than type springs can be employed.

Other suitable resilient biasing means for restoring the stack of plates to their relaxed spaced-apart condition can also be employed instead of springs—for example, a pneumatic component in the form of a closed-cell elastomer structure that is interposed between adjacent plates. The biasing or spring means can also constitute integral protruding parts (tabs, fingers, etc.) of the plates or discrete bodies if the latter are fabricated from a material that is sufficiently resilient and durable to withstand the repeated flexing actions which occur as the shock absorbing assembly is activated and the multiple impacts are initiated.

The striker lever 46 can also be coupled to the operating mechanism of the circuit breaker 16 in such a manner that it moves in reciprocal fashion along a straight path (rather than swinging along an arcuate path) in synchronism with the movement of the operating shaft 34 and movable contact 30.

The invention is also not limited to a compressible multiple-impact shock absorbing assembly 40 of the type illustrated wherein a stack of five plates 41–41d and four interposed wafer-like springs 42–42c are employed. The number of plates and springs will vary depending upon the total amount of kinetic energy to be dissipated which, in turn, is determined by the size of the circuit interrupter apparatus and the total equivalent mass of the movable contact and associated moving parts of the operating mechanism of the interrupter which must be brought to rest. While the mass of the plates (or discrete bodies) is not especially critical, for satisfactory results the mass of each plate (or body) should be equal to but no smaller than about 1/100 of the total equivalent mass of the movable contact and other moving parts of the interrupter.

SPECIFIC EXAMPLE

Tests have shown that the compressible multiple-impact shock absorbing assembly of the present invention is especially adapted for use in vacuum type circuit breakers in the medium voltage range (that is from about 5 to 35 kilovolts). For a 15 KV circuit interrupter having a driving spring and operating mechanism that generated a torque of approximately 50 to 150 foot pounds which opened the contacts (when the interrupter was tripped) and swung the striking lever of the operating mechanism a distance of approximately 25 millimeters, a stack containing from seven to nine plates and six to eight interposed wafer-like springs were required to provide the proper shock absorbing characteristics and bring the movable contact and operating mechanism to a smooth stop in approximately 10 milliseconds and within the contact override and rebound limits of the design specifications. Each of the plates in this specific embodiment were manufactured from steel and were approximately 10 centimeters square, 7 millimeters thick and had a mass of approximately 600 grams. The wafer-like springs, in turn, were manufactured from commercial grade spring steel and were 10 centimeters by 11 centimeters, approximately 0.05 millimeters thick and had a shallow S profile which provided a spacing of approximately 4 millimeters between adjacent plates when the stack was in relaxed noncompressed condition.

ALTERNATIVE EMBODIMENT (FIG. 7)

Figure 7:
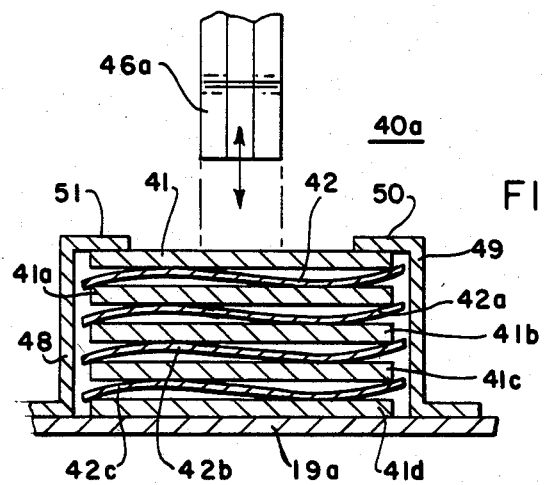
FIG. 7 is a front sectional view of an alternative embodiment of a multiple-impact shock-absorbing assembly according to the invention.

The invention is also not limited to the pin retaining means illustrated in FIGS. 3-5 for maintaining the plates and wafer-like springs in the desired loosely stacked relationship. Such retention can be achieved by various different arrangements, one of which is shown in FIG. 7. For example, by a pair of upstanding guide rails 48, 49 that are welded or otherwise fastened to the support frame 19a of the circuit interrupter, extend along opposite sides of the stacked plates 41–41d and springs 42–42c and have inturned end segments 50 and 51, respectively, which overlap the edges of the top plate 41 in the manner shown in FIG. 7. The guide rails 48 and 49 extend around diagonally-opposite corners of the stacked plates 41–41d and springs 42–42c to provide a loose fitting case or enclosure for the stack without interfering in any way with the movement of the striker lever 46a of the interrupter or the vertical movement and multiple-impact interactions of the individual plates and springs which comprise the shock absorbing assembly 40a.

Since plate 41d rests on the frame 19a of the circuit breaker and remains stationary, it does not absorb any of the kinetic energy and can thus be eliminated from the stack to further decrease the size and cost of the shock absorbing assemblies 40 and 40a.

ADDITIONAL ALTERNATIVE EMBODIMENTS
(FIGS. 8-11)

As shown in FIGS. 8-11, the principle of absorbing mechanical shock and rapidly dissipating kinetic energy by multiple impacts and momentum exchanges between a plurality of loosely-stacked spring-biased discrete bodies of dense durable material which constitutes the novel concept of the present invention can be utilized in various physical embodiments in addition to the metal plate-planar spring arrangements illustrated in FIGS. 3-7.

Figure 8:
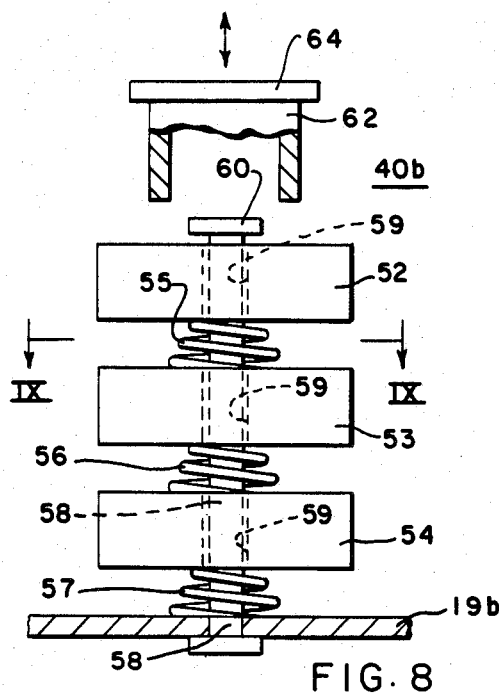
FIGS. 8 and 10 are elevational views, partly in section, of additional alternative embodiments of multiple-impact shock absorbing assemblies.
Figure 9:
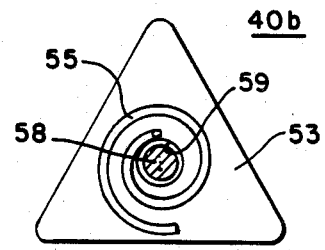
FIGS. 9 and 11 are cross-sectional views of such alternative assemblies, taken along lines IX—IX and XI—XI of FIGS. 8 and 10, respectively.

For example, in the alternative shock absorbing assembly 40b shown in FIGS. 8 and 9, the discrete bodies comprise a series of triangular-shaped blocks 52, 53 and 54 of steel or other suitable dense hard material that are spaced from one another by interposed helical springs 55, 56, 57 of conical configuration. The blocks and springs are held in loosely stacked and movable relationship by a support rod 58 that is secured to a stationary part 19b of the apparatus in which the shock absorbing assembly is used. The rod 58 extends through loose fitting bore holes 59 provided in each of the triangular blocks 52, 53, 54 and is terminated by a suitable head or cap 60 which prevents the blocks from slipping off the rod.

The striker component in accordance with this embodiment comprises a hollow cylindrical member 62 that is reciprocally movable along a straight path (as indicated by the arrow) and is disposed and dimensioned to hit the top surface of triangular block 52 when the cylindrical striker 62 is suddenly displaced by the operating mechanism or other actuating means of the apparatus. A flat reinforcing cap 64 is fastened to the top of the cylindrical striker 62 as shown in FIG. 8.

Figure 10:
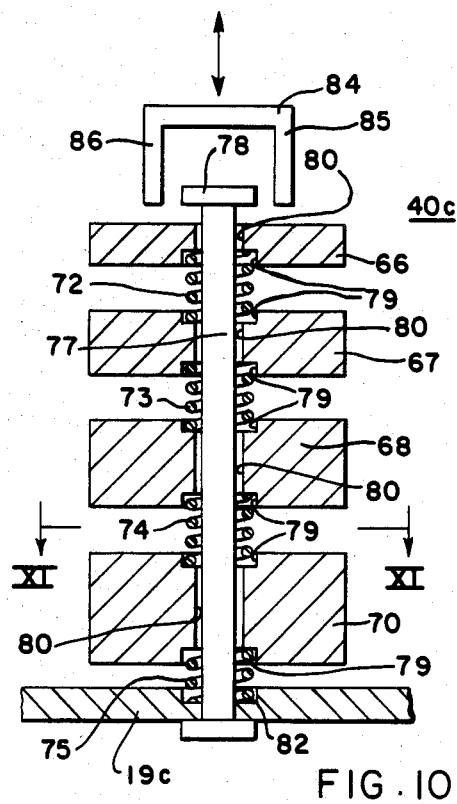
Figure 11:
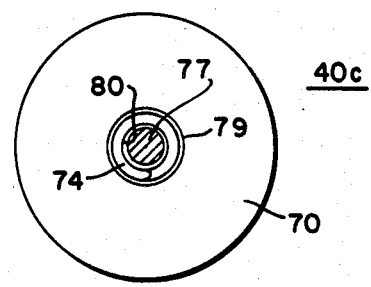

The shock absorbing assembly 40c shown in FIGS. 10 and 11 also employs a series of dense blocks 66, 67, 68, and 70 (of metal or other suitable material) that are spaced apart by interposed coil springs 72, 73, 74, and 75 and held in movable loosely-stacked relationship by a support rod 77 secured to the frame 19c or other stationary part of the apparatus. However, in this embodiment the blocks 66, 67, 68, and 70 are cylindrical in shape and of different sizes and masses, even through they are of the same diameter. The coiled springs 72, 73, 74, and 75 are also of cylindrical configuration and seated in circular wells 79 provided in the opposing faces of the cylindrical blocks. A well 82 is also provided in the flat frame member 19c for this purpose. The wells 79 merge with bore holes 80 in the respective blocks which accommodate the support rod 77 in loose slip-fitting fashion. The rod 77 is again terminated by a retaining head or cap 78.

The striker in this embodiment consists of a U-shaped member 84 that is reciprocally movable along a straight path (as indicated by the arrow in FIG. 10) and is oriented so that the spaced arms 85, 86 of the striker 84 straddle the capped end of the support rod 77 and hit the block 66 when the striker 84 is activated.

Due to the different sizes and masses of the cylindrical blocks 66, 67, 68, and 70, the FIGS. 10–11 embodiment inherently dissipates the kinetic energy of the apparatus at different rates or increments as the multiple collisions and momentum exchanges progress along the stacked assembly of blocks and springs.

As will be obvious to those skilled in the art, any of the disclosed multiple-impact shock absorbing assemblies 40, 40a, 40b and 40c can be mounted within the apparatus with the blocks (or plates) and spacing springs stacked in a lateral or horizontal direction rather than vertically (as illustrated) without detracting from the shock absorbing capability of the assemblies. This universal mounting feature accordingly facilitates the use of the improved compressible shock-absorbing assembly in such devices as rifles, shot guns, large cannon and the like that generate kinetic forces which are laterally rather than vertically directed in most instances.

I claim:

1. In combination with a circuit interrupter having a movable contact that is placed in make-circuit and break-circuit relationship with a stationary contact by an operating mechanism having movable parts, means for decelerating and arresting the motion of the movable contact and associated movable parts of the operating mechanism during the contact-opening stroke of the interrupter after the contacts have been separated, said means comprising:

a compressible shock-absorbing assembly that is mounted on a stationary part of the circuit interrupter support structure proximate a movable part of the interrupter operating mechanism and comprises a plurality of discrete bodies of dense material that are disposed one upon another in loosely stacked array together with a plurality of interposed resilient components that maintain said discrete bodies in spaced-apart relationship when the shock-absorbing assembly is in relaxed non-compressed condition, said discrete bodies and interposed resilient components being freely movable toward and away from one another and said resilient components being adapted to collapse, when the shock-absorbing assembly is suddenly compressed, and permit adjacent discrete bodies to interact with one another in sequential impacting fashion and produce a series of momentum-exchange impacts between the discrete bodies, means holding said discrete bodies and interposed resilient components in loosely-stacked freely-movable array, and means for striking said shock-absorbing assembly coupled to said movable part of the interrupter operating mechanism and disposed to advance toward and move away from the shock-absorbing assembly during the contact-opening and contact-closing strokes, respectively, of the circuit interrupter in synchronism with the movement of the movable contact by said operating mechanism, said compressible shock-absorbing assembly being so positioned that, at a predetermined time during the contact-opening stroke of the circuit interrupter, the advancing striker means hits the shock-absorbing assembly and moves along a path which initiates a series of sequentially-occurring impacting interactions and momentum exchanges between the respective freely-movable discrete bodies and the advancing striker means, with concomitant sequential compression and relaxation of the associated freely-movable resilient spacing means, which rapidly and progressively dissipates the kinetic energy generated by the operating mechanism and moving contact and thus quickly stops the advancing striker means and terminates the contact-opening stroke of the circuit interrupter, the resiliency of said interposed resilient components relative to the mass of the individual discrete bodies being such that the resilient components primarily serve as spacer means for the discrete bodies and thus do not substantially enhance the energy-dissipating capability of the compressible shock-absorbing assembly.

2. The combination of claim 1 wherein the operating mechanism of the circuit interrupter includes a main operating shaft and the striker means is coupled to said main operating shaft.

3. The combination of claim 2 wherein the main operating shaft is rotatable and the striker means comprises a lever which protrudes from the main operating shaft and is so disposed that the angular orientation of said lever has a fixed predetermined relationship to the position of the movable contact.

4. The combination of claim 3 wherein;

said discrete bodies and resilient spacing components are stacked and freely movable along a predetermined axis, and said lever has a free end portion and is so arranged that said free end portion strikes the compressible shock-absorbing assembly and is movable along a path which extends in substantially the same direction as the axis along which the discrete bodies and interposed resilient spacing components of the shock-absorbing assembly are stacked and freely movable.

5. The combination of claim 1 wherein, said discrete bodies are composed of metal and have substantially the same configuration, and the interposed resilient spacing components comprise springs that are also composed of metal.

6. The combination of claim 5 wherein;

said metal bodies comprise plate-like members of substantially the same thickness and mass, said springs are of substantially planar configuration and have substantially the same lateral dimensions as the plate-like members, and the plate-like members and springs are stacked in such a manner that a plate-like member constitutes the end of the shock-absorbing assembly which is adjacent to and is struck by the striker means.

7. The combination of claim 6 wherein;

the movable parts of the circuit interrupter have a predetermined total equivalent mass, the substantially planar springs have a cross-sectional configuration that is of generally shallow S-shape and the springs are of sufficient stiffness to maintain the respective plate-like members in spaced-apart relationship when the compressible shock-absorbing assembly is in relaxed condition, and the number of plate-like members and springs in the stack are so correlated relative to the total equivalent mass of the movable parts of the circuit interrupter and the mass of the individual plate-like members that the kinetic energy is dissipated at a rate which stops the motion of the striker means, and thus the movable contact of the interrupter, within predetermined time and distance limits.

8. A compressible shock-absorbing assembly adapted for use in a circuit interrupter or other apparatus with movable operating parts that must be brought to rest within a predetermined travel distance and period of time after the interrupter or other apparatus has been tripped or otherwise actuated, said shock-absorbing assembly comprising;

a plurality of discrete bodies of dense material and a plurality of resilient components loosely stacked one upon another along a predetermined axis in freely movable relationship along said axis with the resilient components interposed between and separating the adjacent discrete bodies of dense material; and means retaining the dense discrete bodies and interposed resilient components in loosely-stacked array without interfering with the free movement thereof in a direction along said axis so that the resulting assembly can be mounted within the circuit interrupter or other apparatus in impacting relationship with one of the movable operating parts thereof and thereby initiate a series of sequentially-occurring impacting displacements of and momentum exchanges between the adjacent discrete bodies, with concomitant sequential compressions and expansions of the associated resilient components, that rapidly and progressively dissipates the kinetic energy generated by the movable operating parts of the interrupter or other apparatus and quickly stops the motion of said parts, the resiliency of said interposed resilient components relative to the mass of the individual discrete bodies being such that the resilient components merely serve as spacer means for the discrete bodies and substantially all of the kinetic energy generated by said movable operating parts is dissipated by the sequentially-occurring impacting displacements of and momentum exchanges between the discrete bodies.

9. The compressible multiple-impact shock-absorbing assembly of claim 8 wherein;

said discrete bodies are composed of metal and said resilient components comprise metal springs, and said retaining means comprises a pair of upstanding elongated pin-like structures that are secured to a rigid support base and extend upwardly along opposite sides of the stack of metal bodies and springs within aligned loose-fitting openings in the associated side portions of said metal bodies.

10. The compressible multiple-impact shock-absorbing assembly of claim 8 wherein;

the metal bodies are of generally uniform, rectangular configuration and said springs comprise metal springs of substantially planar configuration, and said retaining means comprises at least one pair of guide rails that extend upwardly along and around diagonally-opposite corners of the stacked rectangular metal bodies and substantially planar metal springs to provide a loose-fitting case for said metal bodies and springs without interfering with the free movement thereof along the stack axis.

* * * * *